(12) United States Patent
Rosemann

(10) Patent No.: US 7,797,798 B2
(45) Date of Patent: Sep. 21, 2010

(54) SAW-TOOTH WIRE FOR PRODUCING A SAW-TOOTH ALL-STEEL CLOTHING FOR A ROLLER OR A CARDING ELEMENT OF A SPINNING ROOM MACHINE

(75) Inventor: Hans Rosemann, Mönchengladbach (DE)

(73) Assignee: Truetzschler GmbH & Co. KG, Moenchengladbach (DE)

( * ) Notice: Subject to any disclaimer, the term of this patent is extended or adjusted under 35 U.S.C. 154(b) by 287 days.

(21) Appl. No.: 11/723,478

(22) Filed: Mar. 20, 2007

(65) Prior Publication Data

US 2008/0000053 A1 Jan. 3, 2008

(30) Foreign Application Priority Data

Jun. 29, 2006 (DE) .................. 10 2006 030 418

(51) Int. Cl.
*D01G 15/84* (2006.01)
(52) U.S. Cl. ........................................... 19/114
(58) Field of Classification Search ............ 19/114; 76/112; D15/78
See application file for complete search history.

(56) References Cited

U.S. PATENT DOCUMENTS

| 4,696,080 | A * | 9/1987 | Nakamura | 19/114 |
| 6,289,767 | B1 * | 9/2001 | Cookson | 76/112 |

2007/0101828 A1 5/2007 Wen

FOREIGN PATENT DOCUMENTS

| DE | 34 449 04 A1 | 6/1986 |
| DE | 40 38 352 A1 | 6/1992 |
| DE | 101 56 734 A1 | 5/2003 |
| GB | 2 257 164 A | 1/1993 |
| JP | 2004/058259 A | 2/2004 |
| WO | WO-00/05022 A1 | 2/2000 |
| WO | WO-2006/128745 A1 | 12/2006 |

OTHER PUBLICATIONS http://www.elengroup.com/laser-cutting/ (I07 Nov. 2004).*
United Kingdom Search Report issued in GB 0712292.2 dated Oct. 22, 2007.
German Search Report dated Jan. 11, 2007, issued in De 10 2006 030 418.7.

* cited by examiner

*Primary Examiner*—Shaun R Hurley
(74) *Attorney, Agent, or Firm*—Venable LLP; Robert Kinberg; Leigh D. Thelen

(57) ABSTRACT

In the case of a saw-tooth wire for producing a saw-tooth all-steel clothing for a roller or a carding element of a spinning room machine, having an elongate base region (foot) and an adjoining toothed region (blade) in which teeth are formed by cutting, the teeth comprising a tooth front, a tooth back and two side flanks, between the tooth back and the tooth front of two successively arranged teeth there is a gullet. To produce a saw-tooth wire, which comprises in particular teeth of exact and uniform tooth geometry, the teeth of the saw-tooth wire are made by treating with a laser device.

20 Claims, 6 Drawing Sheets

SAW-TOOTH WIRE FOR PRODUCING A SAW-TOOTH ALL-STEEL CLOTHING FOR A ROLLER OR A CARDING ELEMENT OF A SPINNING ROOM MACHINE

CROSS REFERENCE TO RELATED APPLICATION

This application claims priority from German Patent Application No. 10 2006 030 418.7 dated Jun. 29, 2006, the entire disclosure of which is incorporated herein by reference.

BACKGROUND OF THE INVENTION

The invention relates to a saw-tooth wire for producing a saw-tooth clothing for a roller or a carding element of a spinning room machine, such as a flat card, roller card, cleaner, opener or the like. The invention also includes a method and apparatus for producing the saw-tooth wire.

In general saw-tooth clothing has an elongate base region (foot) and an adjoining toothed region (blade) in which teeth are formed by cutting, the teeth comprising a tooth front, a tooth back and two side flanks, wherein between the tooth back and the tooth front of two successively arranged teeth there is a gullet.

Saw-tooth wire all-steel clothings are used, for example, in the processing of textile fibres to yarns, nonwovens or the like. Here, the individual saw-tooth wires of the saw-tooth wire all-steel clothings have, for example, a height of less than 2 mm and in the region of the tooth tips a width of 0.2 mm or less. To produce such saw-tooth wires, normally a wire-form starting material is first subjected to one or more drawing operations; between the individual drawing operations different heat treatment processes may also be carried out, in order at least partially to restore deformability to the already drawn wire. Following this preparation, the wire is normally provided with saw-teeth using a suitable mechanical stamping device (GB 2 257 164 A). In that process, the saw teeth produced by the stamping operation can also be hardened before or after the stamping operation. After the stamping operation small stamping residues are left behind on the surfaces of the saw-tooth wires.

Furthermore, on the surfaces of the saw-tooth wires there may be impurities caused by the preceding machining steps, such as, for example, scale, i.e. oxide residues, or dust residues which have occurred during the thermal treatment. These residues on the saw-tooth wires are troublesome during subsequent use of the saw-tooth wires for the processing of textile fibres, especially when used on high-performance machines, because individual fibres can be left clinging to the teeth of the clothing and the clothing consequently has an increased tendency to become clogged with fibres and impurities, such as bits of husk or the like. To avoid these disadvantages, saw-tooth wires intended for fabrication of saw-tooth wire all-steel clothings are normally also cleaned and polished after the stamping or hardening operation. In the case of the known saw-tooth wire, the tooth geometry is produced by stamping. One disadvantage is the high wear and tear on the tool. The tools have to be frequently reground or exchanged. Furthermore, production accuracy diminishes with wear, from the start to the end of a clothing, which can amount to several kilometers, and also from clothing to clothing. Another disadvantage is that different tools have to be made for different clothing types. Finally, the subsequent "flame" hardening of the teeth represents a further production step, which is also relatively inexact and hardly yields consistent results.

It is an aim of the invention to produce a saw-tooth clothing wire which avoids or mitigates the said disadvantages and in particular has teeth of relatively exact and uniform tooth geometry.

SUMMARY OF THE INVENTION

The invention provides a method for producing a saw-tooth wire for use as clothing for a roller or a carding element, comprising forming in a wire a multiplicity of teeth using a laser device, the teeth each having a tooth front, a tooth back and opposed side flanks and there being a gullet between the tooth back the tooth front of adjacent teeth.

Through forming of the teeth in accordance with the invention by treatment with a laser device, the teeth can be formed with an accurate and uniform tooth geometry. As the "tool" that—in contrast to stamping—is not subject to wear, the laser is suitable for a reproducible, predetermined tooth geometry. The high temperatures, which are exactly determined, and the energy applied in exact amounts, result in the reproducibly predetermined tooth geometry, both of each individual tooth and of the teeth among themselves. Apart from the considerable manufacturing advantages, a fibre product having a considerably enhanced quality is obtained. A particular process advantage is that formation of the external shape of the teeth and hardening are carried out in one production step. The saw-tooth wire in accordance with the invention is distinguished by high local hardness (with the exception of the foot region), improved wear resistance and a longer service life, and allows an extended regrind cycle.

Advantageously, the teeth are formed by treating a profiled wire, preferably by treating the blade of the profiled wire. In one embodiment, the teeth are formed by cutting out the gullets, especially by cutting out the gullets from the blade of a profiled wire. In another embodiment, the teeth are formed by scoring and breaking out the gullets, especially by scoring and breaking out the gullets from the blade of the profiled wire. Advantageously, the laser device is a $CO_2$ laser. Cutting may be effected by, for example, laser beam fusion cutting or laser gas cutting. Advantageously, the laser device allows the laser beam to be positioned in at least two axes. Preferably, the laser device allows a multi-axial positioning of the laser beam. For multi-axial positioning, the laser device may be connected to an electronic open loop and closed loop control means.

In some embodiments, the laser device is stationary. The laser beam may be stationary. In further embodiments, the laser device may be movable and/or the laser beam may be movable. In certain embodiments an at least two-axis positioning of the profiled wire is rendered possible. The arrangement for positioning the profiled wire may advantageously be connected to an electronic open loop control means. Where present, the electronic open loop and closed loop control means may be programmable for positioning the laser beam and/or the profiled wire. In one embodiment at least one mirror is arranged between the laser device and the saw-tooth wire. It is advantageous for the teeth of the saw-tooth wire to be at least partially hardened by treatment with the laser device.

At least one laser beam, for example, two or more laser beams, may be used. In one embodiment, one laser beam produces the teeth and a further laser beam for hardening purposes is directed substantially onto the regions of the teeth that engage with the fibre material. Advantageously, the hardening process takes place at the surface of the tooth. Preferably, the hardening process takes place in the edge region of the tooth. Cutting out or scoring is advantageously effected using inert gas, e.g. nitrogen, or oxygen. In certain embodiments, the laser beam and the profiled wire are movable relative to one another. For example, the laser beam may be stationary and the profiled wire is movable, or the laser beam and the profiled wire may be movable. In some embodiments, the laser beam and the profiled wire are moved relative to one another, the laser beam cutting the teeth i.e. the gullets out of the blade corresponding to the contour of the teeth.

The laser beam is advantageously guided corresponding to the contour of the teeth, the teeth i.e. gullets being cut out of the blade. In further embodiments, the laser is stationary and the profiled wire is movable, the profiled wire being guided corresponding to the contour of the teeth and the teeth i.e. gullets being cut out of the blade. Advantageously, the laser beam is guided by deflection corresponding to the contour of the teeth and teeth i.e. gullets being cut out of the blade.

In a further method the laser and the profiled wire are moved relative to one another, the laser beam scoring the contour of the teeth into the blade and the gullet pieces being ejected from the blade. In yet a further method, the laser is stationary and the profiled wire is movable, the profiled wire being guided corresponding to the contour of the teeth, the teeth being scored into the blade and the gullet pieces being ejected from the blade. In one advantageous method the movements of the laser and/or of the profiled wire are continuous. In another advantageous method the laser device delivers a laser beam in the shape of the desired contour of the gullet, and the laser and the profiled wire are arranged to be moved relative to one another incrementally, the laser beam, in the shape of the contour of the gullet, cutting the gullets out of the blade. In yet a further method, the laser and the profiled wire are arranged to be moved relative to one another incrementally, the laser beam, in the shape of the contour of the gullet, scoring the contour of the teeth into the blade and the gullet pieces being ejected from the blade. It may be advantageous for the wire, after the laser treatment, to be deburred, for example, by two grinding discs. It may be advantageous for the laser device to be connected to a controllable drive means for positioning.

The drive means for the laser device may be connected to a programmed electronic control means. The programmed electronic control means may allow multi-axial positioning of the laser device.

The invention also provides a roller or a carding element having a saw-tooth all-steel clothing manufactured according to the invention. For example, the clothing may be used on one or more or the cylinder, a lickerin, or the doffer of a flat card or roller card, the stripping roller of a flat card, the open roller of a card feeder, the feed roller of a flat card, a roller card or a cleaner, or the opener roller of an open-end rotor spinning machine. The roller (clothed roller) may be present in a cleaner or an opener.

A saw-tooth wire manufactured according to the invention may be used on carding elements selected from, for example, stationary carding elements of a flat card or a cleaner and flat bars of a revolving flat of a flat card. In an especially advantageous embodiment, a clothing element equipped with saw-tooth wire sections according to the invention is non-movably arranged facing a roller comprising saw-tooth wire according to the invention.

The saw-tooth wire may be present in a clothing for a combing device on spinning room machines, for example, circular comb or top comb of a combing machine.

The invention moreover provides a saw-tooth wire for manufacture of a saw-tooth all-steel clothing for a roller or a carding element of a spinning room machine, such as a flat card, roller card, cleaner, opener or the like, having an elongate base region (foot) and an adjoining toothed region (blade), in which teeth are formed by cutting, the teeth having have a tooth front, a tooth back and two side flanks, wherein between the tooth back and the tooth front of two successively arranged teeth there is a gullet, in which teeth of the saw-tooth wire are produced by treating a profiled wire with a laser device and are at least partially hardened. The teeth are advantageously hardened in the edge region and/or at their surface.

The invention further provides a saw-tooth wire for producing a saw-tooth all-steel clothing for a roller or a carding element of a spinning room machine, such as a flat card, roller card, cleaner, opener or the like, having an elongate base region (foot) and an adjoining toothed region (blade) in which teeth are formed by cutting, the teeth comprising a tooth front, a tooth back and two side flanks, wherein between the tooth back and the tooth front of two successively arranged teeth there is a gullet, wherein the teeth of the saw-tooth wire are produced by treating a wire with a laser device.

A further aim of the invention is to produce an advantageous device for carrying out the methods according to the invention.

DESCRIPTION OF CERTAIN PREFERRED EMBODIMENTS

Figure 1:
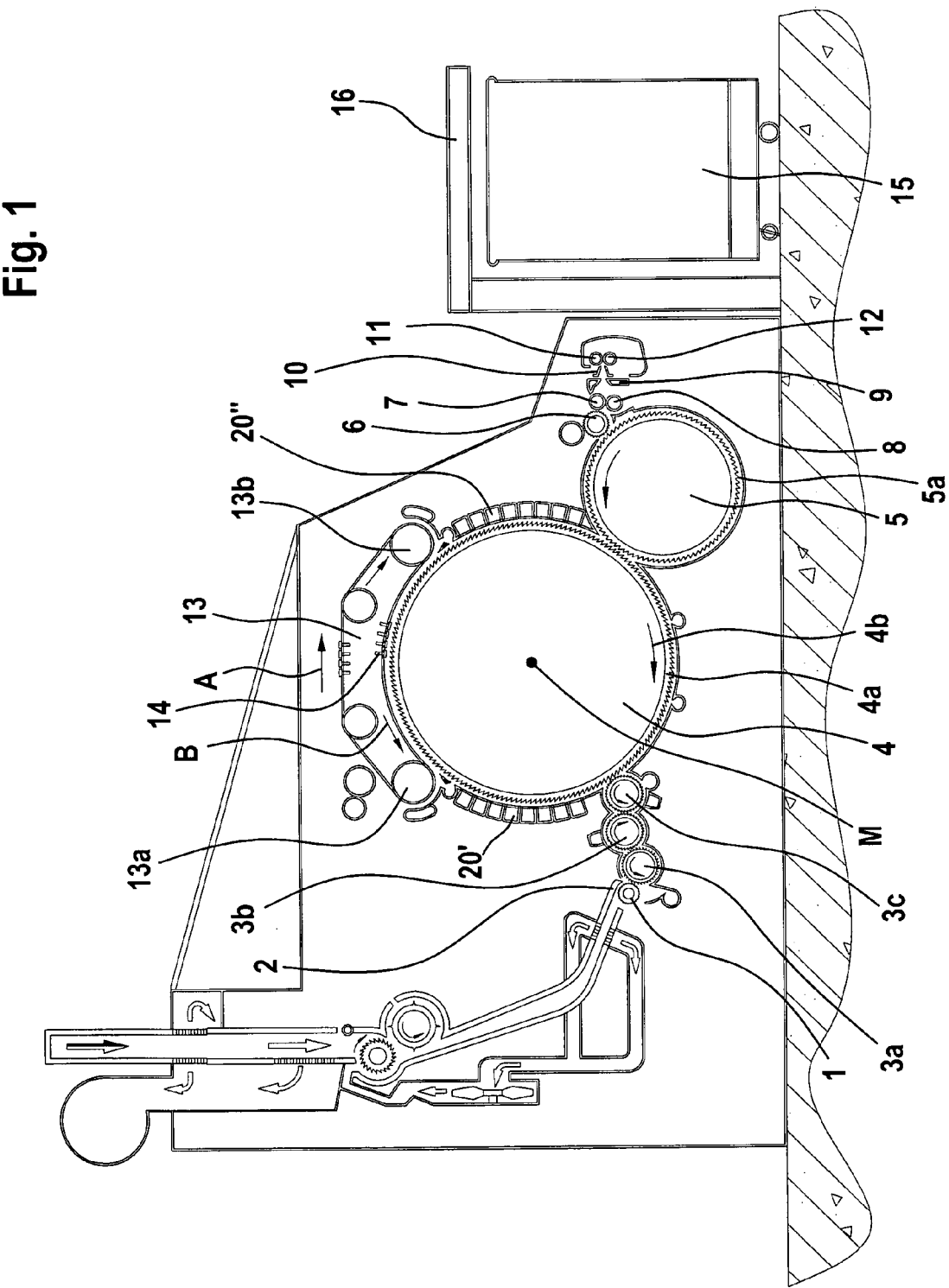
FIG. 1 is a schematic side view of a carding machine with a saw-tooth clothing according to the invention.

With reference to FIG. 1, a flat card, for example, a card TC 03 made by Trützschler GmbH & Co. KG of Mönchengladbach, Germany, has a feed roller 1, feed table 2, lickerins 3a, 3b, 3c, cylinder 4, doffer 5, stripping roller 6, squeezing rollers 7, 8, web-guide element 9, web funnel 10, take-off rollers 11, 12, revolving flat 13 with flat guide rollers 13a, 13b and flat bars 14, can 15 and can coiler 16. The directions of rotation of the rollers are shown by respective curved arrows. The letter M denotes the midpoint (axis) of the cylinder 4. The reference numeral 4a denotes the clothing and reference numeral 4b denotes the direction of rotation of the cylinder 4. The letter A denotes the work direction. The curved arrows drawn in the rollers denote the direction of rotation of the rollers. Between the lickerin 3c and the rear flat guide roller 13a and between the doffer 5 and the front flat guide roller 13b a plurality of stationary carding elements 20' and 20" (see FIG. 2) are arranged facing the cylinder 4.

In the course of drawing on the wire, the saw-tooth wire SD according to the invention is unwound from a supply reel mounted on a bearing block, then passed through a braking device and wound as carding clothing 4a onto the outer periphery of the cylinder 4.

After the winding-on procedure, the carding clothing 4a runs helically on the outer periphery of the cylinder 4.

The feed roller 1, the lickerins 3a, 3b, 3c, the doffer 5 (doffer clothing 5a), the stripping roller 6 and the flat bars 14 of the flat card can also be clothed with the saw-tooth wire SD according to the invention.

Figure 2:
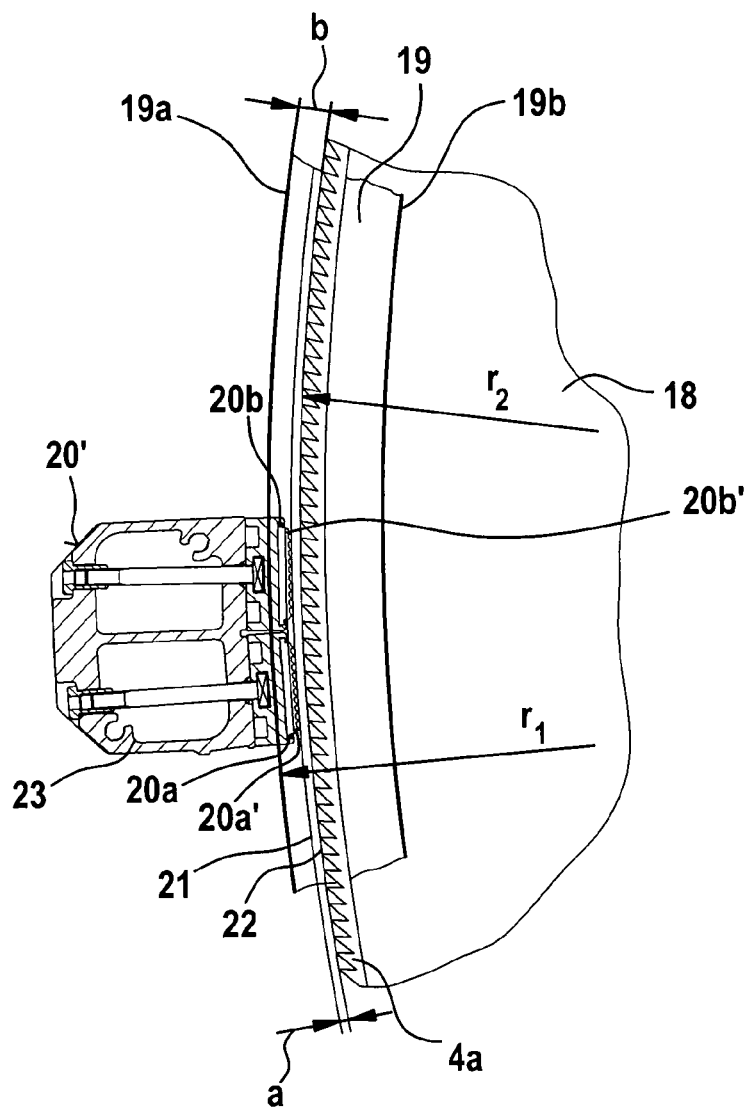
FIG. 2 is a section through a carding segment and a portion of a side panel with a clearance between carding segment clothing and cylinder clothing.
Figure 2A:
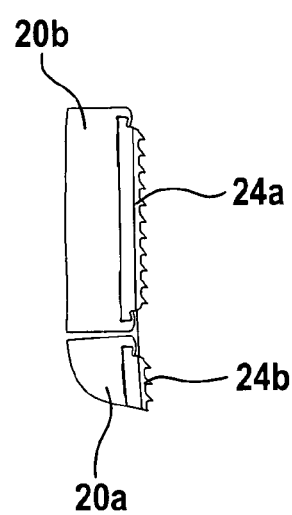
FIG. 2a is a detailed view of the carding elements of FIG. 2.

Referring to FIG. 2, on each side of the card an approximately semi-circular, rigid side panel 18 is secured laterally to the machine frame (not shown); cast concentrically onto its outer side in the region of the periphery thereof there is a curved, rigid bearing element 19, which has a convex outer surface 19a as its support surface and an underside 19b. A stationary carding segment 20' has bearing surfaces at both ends, which lie on the convex outer surface 19a of the bearing element (for example, an extension bend). Carding elements 20a, 20b with clothing strips 20a', 20b' (carding clothings 24a, 24b) are mounted on the undersurface of the stationary carding segment 20'. The reference number 21 denotes the tip circle of the clothings 20a', 20b'. The cylinder 4 has on its periphery the cylinder clothing 4a, (saw-tooth wire SD). The reference numeral 22 denotes the tip circle of the cylinder clothing 4a. The distance between the tip circle 21 and the tip circle 22 is denoted by the letter a, and is, for example, 0.20 mm. The clearance between the convex outer surface 19a and the tip circle 22 is denoted by the letter b. The radius of the convex outer surface 19a is denoted by $r_1$ and the radius of the tip circle 22 is denoted by $r_2$. The radii $r_1$ and $r_2$ intersect at the mid-point M of the cylinder 4. The carding segment $20^I$ shown in FIG. 2 consists of a support 23 and two carding elements 20a, 20b, which are arranged in succession in the direction of rotation (arrow 4b) of the cylinder 4, the clothings 20a', 20b' of the carding elements 20a, 20b and the clothing 4a of the cylinder 4 lying facing each other. The carrier body 23 consists of an aluminum hollow profiled member and has continuous hollow spaces. The clothing strips 20a', 20b' are fitted with a plurality of sections of the saw-tooth wire SD according to the invention as clothing sections 24a, 24b, which—viewed across the width of the machine and along the length of the stationary carding segments 20' and 20"—are arranged in close proximity to one another.

Figure 3:
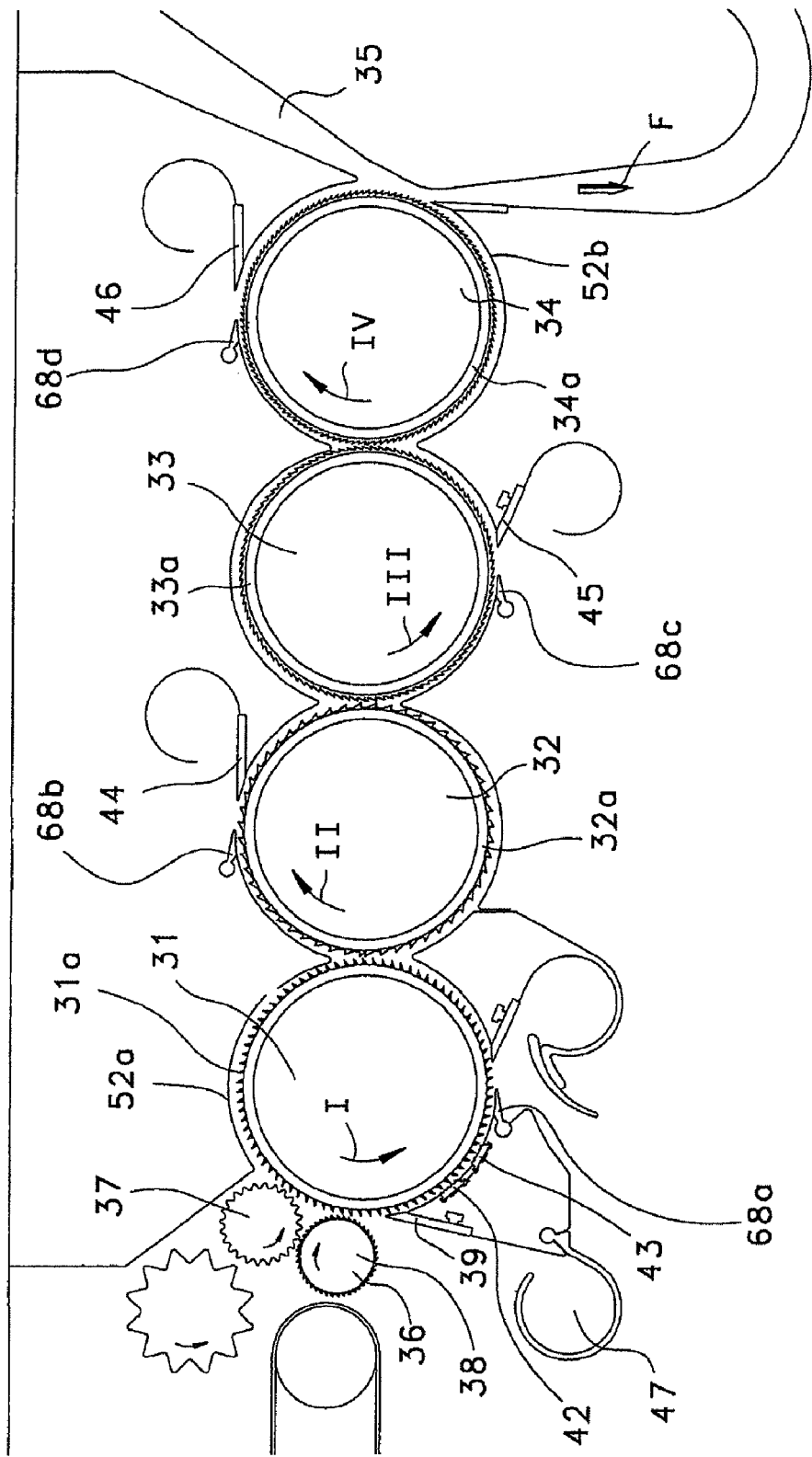
FIG. 3 is a schematic side view of a 4-roller cleaner with a saw-tooth wire according to the invention.

FIG. 3 shows a cleaner, for example, a CL-C4 made by Trützschler GmbH & Co. KG, with four rollers 31, 32, 33 and 34 arranged in succession, the directions of rotation of which are indicated by I, II, II and IV. At the end of the roller 34 there is a pneumatic extraction device 35 for the fibre material (arrow F). The diameter of the rollers 31 and 34 is the same. The circumferential speed of each successive roller is greater than the circumferential speed of the respective preceding roller. The fibre material to be cleaned, especially cotton, is fed in tuft form to the cleaning device arranged in a closed housing. This is carried out, for example, through a hopper (not shown), by a conveyor belt or the like. The lap is fed by means of two feed rollers 36, 37 in engagement with a spiked roller 31 (diameter 150 to 300 mm, e.g. 250 mm), which is rotatably mounted in the housing and rotates counterclockwise (arrow I). A clothed roller 32 is arranged downstream of the spiked roller 31. The clothed roller 32 is covered with a saw-tooth clothing comprising saw-tooth wire 32a, the clothed roller 33 is covered with a saw-tooth clothing comprising saw-tooth wire 33a, and the clothed roller 34 is covered with a saw-tooth clothing comprising saw-tooth wire 34a, and all have a diameter of about 150 mm to 300 mm, e.g. 250 mm. The roller 31 has a circumferential speed of approximately 10 to 21 msec, e.g. 15 msec, the roller 32 has a circumferential speed of approximately 15 to 25 msec, the roller 33 has a circumferential speed of approximately 30 to 35 msec, e.g. 32 msec, and the roller 34 has a circumferential speed of approximately 40 to 50 msec, e.g. 46 msec. Associated with the spiked roller 31 is a separation opening 38 for egress of impurities in the fibre, the size of the opening being adapted or adaptable to the degree of contamination of the cotton. A separation edge 39, e.g. a knife, is associated with the separation opening 38. In the direction of the arrow I, a further separation opening and a separation edge are provided at the roller 31. The numerals 42 and 43 denote stationary carding elements, which are clothed with saw-tooth wires according to the invention. Separation openings and separation edges 44, 45, 46 are likewise associated with the clothings of the clothed rollers 32, 33, 34 with the saw-tooth wire 32a, 33a and 34a respectively. The rollers 31 to 34 are enclosed by covering elements 52a, 52b. The numerals 68a through 68d denote adjustable guide elements.

The mode of operation is as follows: The lap comprising fibre tufts is fed by the feed rollers 36, 37 in engagement with the spiked roller 31, which combs through the fibre material and picks up clusters of fibres on its spikes 31a. As the roller 31 passes the separation opening, in accordance with the circumferential speed and curvature of this roller and the size of the separation opening matched to this first separation stage, short fibres and coarse impurities fly out of the fibre material owing to centrifugal force and after passing through the separation opening enter a waste box in the extraction housing 47. The fibre material pre-cleaned in this way is removed from the first roller 31 by the clothing points 32a of the clothed roller 32, thus undergoing further loosening. As the roller 32 passes the separation edge 44, further impurities fly out of the fibre sliver owing to centrifugal force. The fibre material is subsequently removed by the clothing points 33a of the clothed roller 33, from there is removed by the clothing points 34a of the clothed roller 34 and finally discharged through the duct 35. The clothed rollers 32, 33 and 34 are clothed with the saw-tooth wire according to the invention, 32a, 33a, and 34a respectively. The point density of the clothings (pps—points per square inch) increases from the clothed rolled 32 through the clothed roller 33 to the clothed roller 34.

To produce the saw-tooth wire SD according to the invention (see FIGS. 12a, 12b), a specially shaped profile band, a profiled wire PD (see FIGS. 11a,11b) is used, in which teeth 27 are made by laser treatment. Profiling of the one-piece profiled wire PD is generally produced by non-cutting shaping, e.g. by rollers, by drawing, or the like. Three methods of saw-tooth wire SD manufacture are illustrated in FIGS. 4 to 6.

Figure 4:
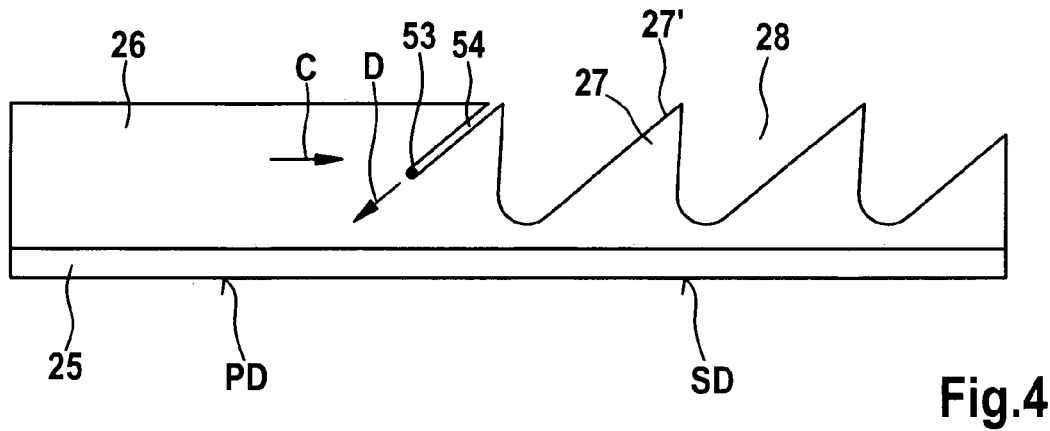
FIG. 4 shows schematically in side view a first method of manufacture of saw-tooth wire according to the invention, in which the laser beam is guided corresponding to the contour of the teeth.

In the embodiment of FIG. 4, a profiled wire PD is moved in direction C. At the same time, a laser beam 53 is moved in the direction of the contour 27' of the teeth 27. The laser beam 53 moves corresponding to the example illustrated in FIG. 4 in direction D along the contour 27' of the back of a tooth 27. The laser beam 53 acts on the blade 26 of the profiled wire PD and leaves behind a kerf 54, whereby a gullet 28 is cut out of the blade 26. By means of a multi-axially controllable machine tool (not shown), a laser is controlled by software so that it travels along the contour 27' of the tooth geometry and thus "burns out" the clothing. Each new clothing can then be manufactured by modifying the software. The laser travels along the contour 27' and cuts out the tooth geometry. The profiled wire PD moves in one direction C. The movements in directions C and D are program-controlled.

Figure 5:
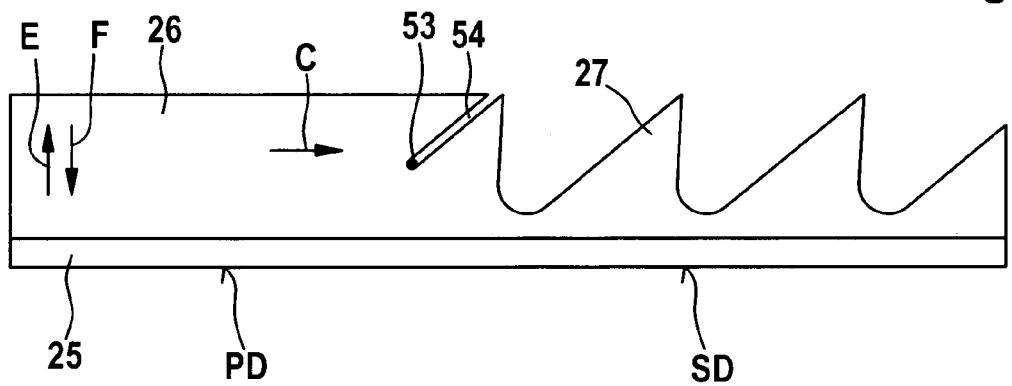
FIG. 5 shows schematically in side view a second method of manufacture of saw-tooth wire according to the invention, in which the profiled wire is guided corresponding to the contour of the teeth.
Figure 6:
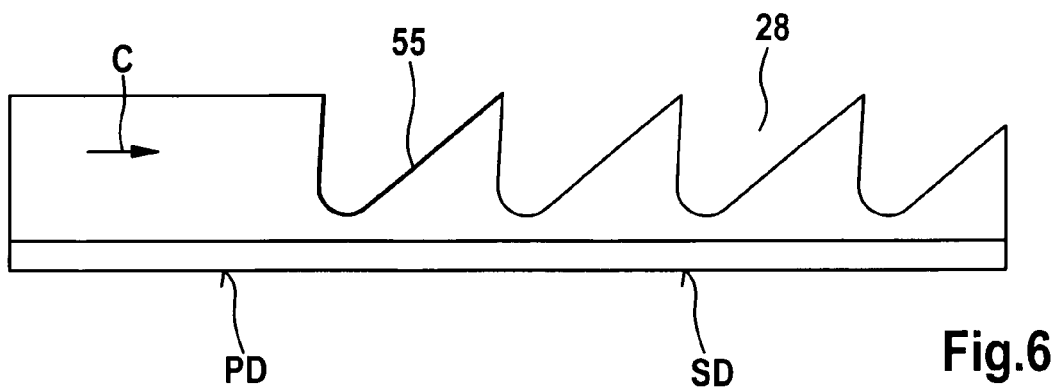
FIG. 6 shows schematically in side view a third method of manufacture of saw-tooth wire according to the invention, in which the laser beam is in the shape of the contour of the gullet.

In the embodiment of FIG. 5, the profiled wire PD is moved in direction C and at the same time alternately in directions E and F. The laser beam 53 is, in contrast to FIG. 4, stationary. In this way, two mechanical axes in the directions E and F are provided. The movements in directions C, E and F are program-controlled. The formation of the saw-tooth wire SD by cutting the teeth 27 out of the blade 26 otherwise corresponds substantially to the example according to FIG. 4.

The movements in the directions C, D, E and F in FIGS. 4 and 5 are continuous.

In the embodiment of FIG. 6, the profiled wire PD is moved in direction C. Movement can be by increments or continuous. The laser beam 55 is in the shape of the contour of the gullet 28. The laser beam 55 is in the particular shape that it is to cut out of the blade 26, i.e. the gap (gullet 28) between two successive teeth 27. This can be done using a template that imparts the corresponding shape to the laser beam 55. It is also possible, by simply exchanging the template, to produce a predetermined tooth shape. Using mirrors and prisms it is possible to burn out a plurality of gullets 28.

Figure 4A:
FIG. 4a shows a cut-out part.

A cut-out part 67 (see FIG. 4a) is cut out of the blade 26, as shown in any of FIGS. 4 to 6. The cut-out part 67 is removed. This produces a cut-out in the blade 26. By further cut-outs in direction C the teeth 27 are formed in the blade 26. Between two successive teeth $27_1$, $27_2$ there is a gullet 28 in the blade 26. The size of the gullet 28 corresponds to the size of the cut-out part 67 plus the width (breadth) of the cutting slot of the kerf 54. The cutting slot width of the kerf 54 must be taken into account in the production of the finished size of the teeth 27 and the gullets 28. The external shape of the teeth 27 is produced by the cutting out process.

The relative movement between the laser beam 53 and the blade 26 of the profiled wire PD required to produce a continuous kerf 54 can be achieved in different ways. For laser cutting, the profiled wire PD can be moved below the stationary laser beam 53, for example, by means of an X/Y co-ordinate displacement means (see FIG. 10). In addition, for laser cutting either the laser source including the cutting head can be moved over the profiled wire PD (see FIG. 4), or a movable mirror system can be guided together with the cutting head ("flying optics" system) between the stationary laser device and the profiled wire PD.

Figure 7:
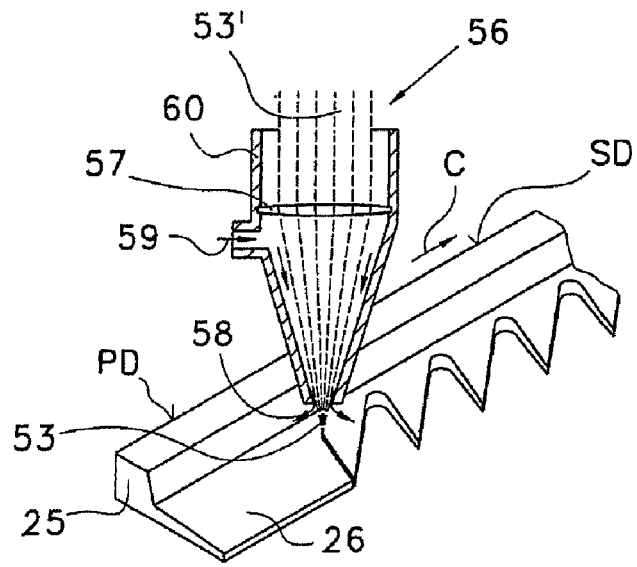
FIG. 7 is a perspective view of the association of a device for laser beam fusion cutting with a profiled wire during manufacture.

One suitable arrangement for laser cutting of a saw-tooth wire is shown in FIG. 7. During laser beam fusion cutting by means of a laser device 56, a laser beam 53' that is generated by means of gases (gas laser) or crystals (solid-state laser) serves for cutting, and is focussed (bunched) by at least one lens 57 onto a very small area of the surface of the blade 26 of the profiled wire PD. The steel of the profiled wire PD fuses or evaporates and is blown out of the kerf 54 by a gas jet 58 (see FIGS. 4 and 5). The cutting gas 59 is an inert gas, usually nitrogen or argon, and is introduced into the cutting nozzle 60 through an inlet.

The laser beam 53 can operate in free space or can be guided through a medium, such as oil or water. The laser power and the cutting speed need to be adapted to the type of material (steel) and material thickness of the profiled wire PD. For example: the material can be Remanit (X 5 Cr Ni18-10), thickness 0.7 mm, maximum feed rate 16.0 m/min, cutting gas nitrogen.

Figure 8:
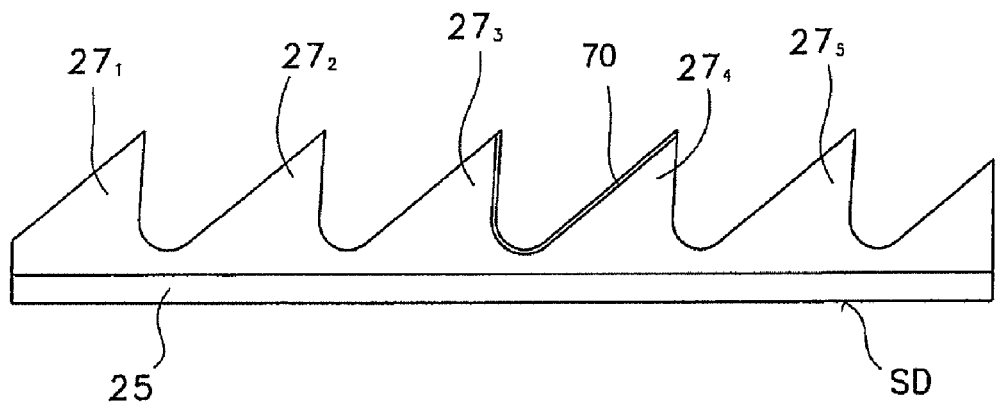
FIG. 8 is a side view of the saw-tooth wire with hardened edge regions.

In the embodiment shown in FIG. 8, the case depth of the saw-tooth wire is denoted by the numeral 70. Since high temperatures are generated during lasing, but can be exactly determined, the energy should be applied in metered amounts so that in parallel with the cutting-out operation a hardening process occurs at the surface of the tooth 27. Since the temperature of the laser is always exactly the same, a constant hardness or case depth is ensured from tooth $27_1$ to tooth $27_2$-$27_5$. The hardness is thus limited purely to the part of the tooth 27 that engages with the fibre material during carding or cleaning. The flexibility of the tooth base 25, which is needed for winding the saw-tooth wire SD onto the roller, e.g. the cylinder 4, is thus ensured.

Figure 9:
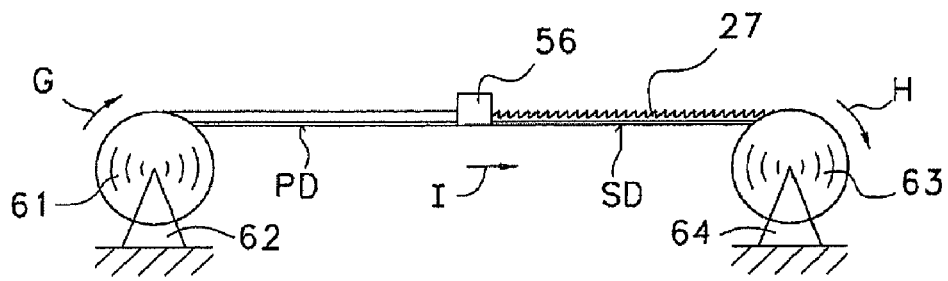
FIG. 9 is a side view of a rig for manufacturing a saw-tooth wire according to the invention with a laser device.

One illustrative embodiment of an apparatus for manufacturing, and subsequently winding, a saw-tooth wire is shown in FIG. 9. A take-off reel 61 of profiled wire PD is provided, which is mounted on a stationary frame 62 so as to rotate in direction G. The profiled wire PD is supplied continuously in direction I to the laser device 56. The saw-tooth wire SD formed by treating the profiled wire PD with the laser device 56 moves in direction I to the driven take-up reel 63, which is mounted on a stationary frame 64 to rotate in direction H.

Figure 10:
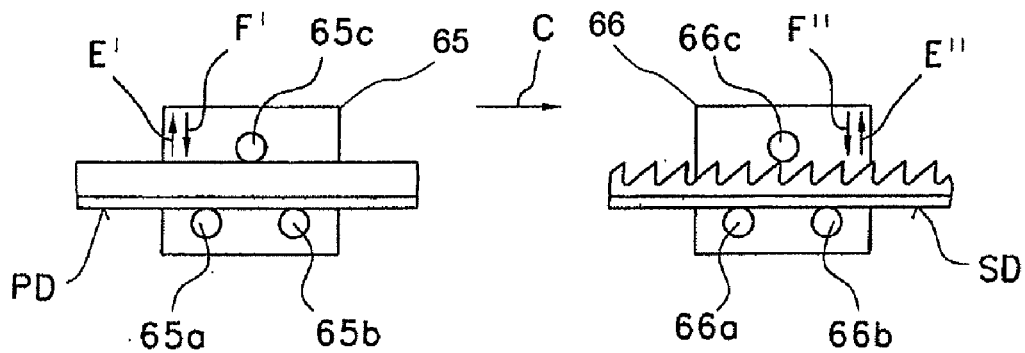
FIG. 10 is a side view of a displacement device.

As already mentioned, FIG. 10 shows a displacement device which, for carrying out a manufacturing process of the kind shown in FIG. 5, effects displacement in the direction of the arrows E and F-perpendicular to direction C. For that purpose, displacement devices 65 and 66 are provided at a distance before and after the laser device for example the laser device 56 shown in FIG. 9. Each displacement device comprises two bottom rollers 65a, 65b and 66a, 66b respectively and one top roller 65c and 66c respectively. The displacement in directions E', F' and E", F" corresponds to the tooth depth h6 (see FIG. 12a) and can be, for example, in the case of a fine cylinder clothing 4a, 1 mm and less.

Figure 11A:
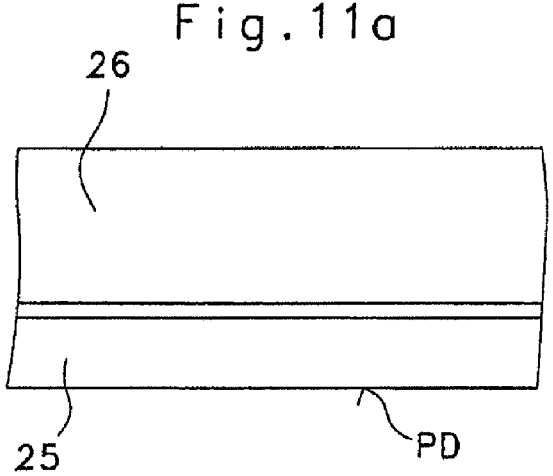
FIGS. 11a and 11b show a side view (FIG. 11a) and sectional view (FIG. 11b) of a profiled wire before cutting.
Figure 11B:
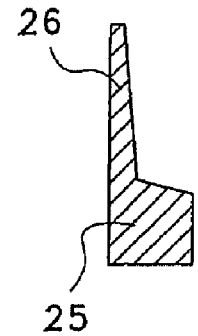

FIGS. 11a and 11b show in side view and in section respectively a profiled wire PD, which comprises a foot 25 and blade 26 in one piece, and is suitable for use in the method of the invention to make a saw-tooth wire.

Figure 12A:
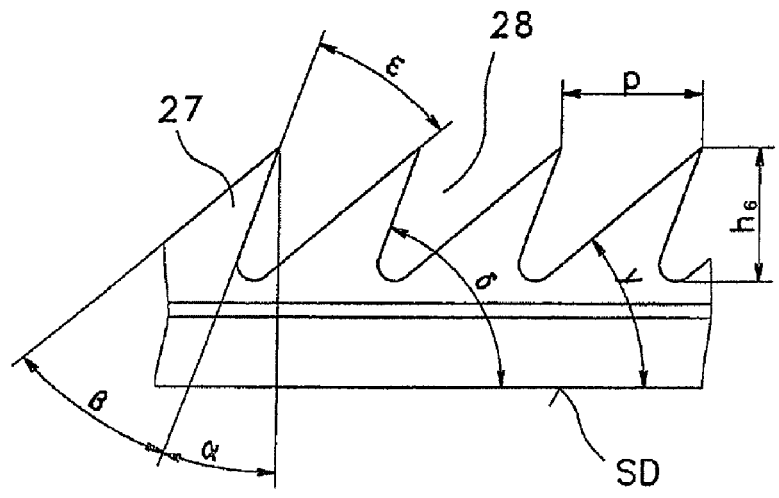
FIGS. 12a and 12b are, respectively, a side view (FIG. 12a) and sectional view (FIG. 12b) of a saw-tooth wire manufactured according to the invention.
Figure 12B:
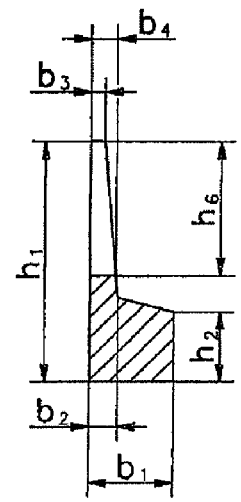

FIGS. 12a and 12ba show in side view and in section respectively an illustrative embodiment of saw-tooth wire SD, which comprises a foot 25 and a blade 26 in one piece. The following are marked in FIG. 12a:

| Symbol | Term | Definition |
| --- | --- | --- |
| α | Front angle | Angle between front face and the vertical axis to the wire base |
| β | Wedge angle | Angle between front angle δ and back angle γ of the tooth |
| γ | Back angle | Angle between back face and the wire base |
| δ | Front angle | Angle between front face and the wire base |
| ε | Opening angle | Corresponds to the wedge angle (ε = γ) |
| h₆ | Tooth depth | Depth of the gullet cut-out, measured from the tooth tip |
| p | Tooth spacing | Distance between successive tooth tips, measured on the |

The following are marked in FIG. 12b:

| Symbol | Term | Definition |
|---|---|---|
| $h_1$ | Overall height of wire | Distance from the base to the wire tip |
| $h_2$ | Base height | Height of the foot measured from the base |
| $b_1$ | Base width | Width of the foot at the wire base |
| $b_2$ | Blade width at foot | Width of the blade, measured at the foot |
| $b_3$ | Blade width at tip | Width of the blade, measured at the tip |

The blade height is denoted by $h_3$, which is obtained from the difference $h_1$-$h_2$. $b_4$ denotes the blade width at the point of the deepest gullet cut-out.

The following is an example of saw-tooth wire dimensions for a clothing 5a of a doffer 5 of the flat card TC 03 (see FIG. 1), which clothing is manufactured by Trützschler Card Clothing GmbH, D-75387 Neubulach, Germany, and could expediently be manufactured using a method according to the invention:

T 40 30 100 0295 28 FGR Z
T=Trützschler wire
40=total height (1/10mm) $h_1$
30=front angle)(°) α
100=base width (1/100 mm) $b_1$
0295=point density (points per square inch)
28=working height (110 mm) $h_1$-$h_2$
FGRZ=surface treatment.

The following is an example of saw-tooth wire dimensions for a clothing 4a of a cylinder 4 of the flat card TC 03, which clothing is manufactured by Trützschler Card Clothing GmbH, D-75387 Neubulach, Germany, and could expediently be manufactured using a method according to the invention:

X 6338
$b_1$=0.39 mm
$b_2$=0.16 mm
$b_3$=0.07 mm
$b_4$=0.13 mm
$h_1$=1.98 mm
$h_2$=1.23 mm
$h_3$=0.75 mm
$h_6$=0.44 mm.

The invention relates to a saw-tooth wire SD for the manufacture of saw-tooth all-steel clothing for a rotating roller or a stationary carding element of a spinning room machine, having a base part 25 and adjoining the same—either by way of a base shoulder or directly without a base shoulder, as specified in DIN ISO 5334—a blade part 26, the blade part 26 comprising saw teeth 27 formed by tooth incisions 28 starting from the edge of the blade part 26 remote from the foot base 25.

Since slight burring at the edge of the tooth 27 may in some circumstances occur during lasing, the clothing wire (saw-tooth wire SD) has to be drawn through two grinding discs after burning, so that the teeth 27 have an absolutely clean contour.

The advantages of the method according to the invention are inter alia:
No different tools
No tool wear, tolerances thus maintained for all teeth
Easy change-over to new clothing forms
Lasing and hardening in one production step
Exact case depth observed
Reproducible operation during lasing and hardening Although the foregoing invention has been described in detail by way of illustration and example for purposes of understanding, it will be obvious that changes and modifications may be practised within the scope of the appended claims.

The invention claimed is:

1. A method for producing a saw-tooth wire for use as clothing for a roller or a carding element, comprising:
   forming in a wire a multiplicity of teeth using a first laser beam of a laser device, the teeth each having a tooth front, a tooth back and opposed side flanks and there being a gullet between the tooth back and the tooth front of adjacent teeth; and
   hardening an edge region of the teeth of the saw-tooth wire to a constant case depth by treatment with a second laser beam of the laser device directed substantially onto the edge region of the teeth that engages with the fibre material.

2. A method according to claim 1, wherein the forming comprises laser cutting the multiplicity of teeth in a blade portion of the wire.

3. A method according to claim 1, wherein the forming comprises scoring and breaking out gullet pieces from a blade portion of the wire.

4. A method according to claim 1, wherein the laser device is a $CO_2$ laser.

5. A method according to claim 1, wherein the forming comprises laser beam fusion cutting.

6. A method according to claim 1, wherein the forming comprises laser gas cutting.

7. A method according to claim 1, further comprising moving at least one of the laser device or the wire during the forming of said teeth.

8. A method according to claim 1, wherein the forming comprises cutting out or scoring the teeth using an inert gas or oxygen.

9. A method according to claim 1, further comprising moving at least one of a laser beam or the wire relative to the other such that the laser beam cuts or scores the gullets out of the wire corresponding to a contour of the teeth.

10. A method according to claim 1, wherein the laser device is stationary and a laser beam is guided by deflection corresponding to a contour of the teeth, wherein the gullets are cut out of or scored in a blade portion of the wire so as to form the teeth.

11. A method according to claim 1, further comprising continuously moving at least one of the laser device or the wire.

12. A method according to claim 1, further comprising moving at least one of the laser device and the wire relative to the other incrementally, wherein a laser beam of the laser device is in the shape of a contour of the gullet to cut the gullets out of a blade portion of the wire.

13. A method according to claim 1, further comprising deburring the saw-tooth wire after the teeth have been formed by the laser device.

14. An apparatus for manufacture of a saw-tooth wire for use as clothing for a roller or a carding element, comprising a laser device and a device for presenting a wire to the laser device,
   wherein the laser device is arranged to generate a first laser beam to form teeth and intervening gullets, and wherein at least one of the first laser beam and the wire are configured to move relative to the other along at least two axes, and wherein the laser device is arranged to generate a second laser beam to harden an edge region of the teeth of the wire to a constant case depth, wherein the second laser beam is directed substantially onto the edge region of the teeth that engages with the fibre material.

15. An apparatus according to claim 14, further comprising an electronic open loop and closed loop control device connected to the laser device for relative positioning of the laser device and wire, wherein the control device is programmable to position at least one of the laser beam or the wire.

16. Saw-tooth wire for manufacture of a saw-tooth all-steel clothing for a roller or a carding element of a spinning room machine, comprising:
an elongated base region and an adjoining toothed region, wherein the toothed region comprises teeth each having a tooth front, a tooth back and two side flanks, wherein between the tooth back and the tooth front of adjacent successively arranged teeth there is a gullet, and wherein an edge region of the teeth of the saw-tooth wire is laser-hardened to a constant case depth.

17. A roller having a wound clothing comprising the saw-tooth wire according to claim 16, the roller being a cylinder, a lickerin, or a doffer of a flat card or roller card, a stripping roller of a flat card, a roller of a cleaner or opener, an opener roller of a card feeder or open-end rotor spinning machine, or a feed roller of a flat card, roller card or cleaner.

18. A carding element comprising a clothing including a multiplicity of the saw-tooth wire according to claim 16, the carding element being a stationary carding element of a roller card or a cleaner.

19. A method according to claim 1, wherein hardening along the edge region of the teeth of the saw-tooth wire by treatment with the second laser beam of the laser device includes hardening the gullets between the tooth back and the tooth front of adjacent teeth.

20. An apparatus according to claim 14, wherein the laser device that is arranged to generate the second laser beam to harden the edge region of the teeth of the wire also hardens the gullets between the tooth back and the tooth front of adjacent teeth.

* * * * *